US006913690B2

(12) United States Patent
Mattox

(10) Patent No.: US 6,913,690 B2
(45) Date of Patent: Jul. 5, 2005

(54) DEBRIS REMOVAL SYSTEM

(75) Inventor: James R. Mattox, Rockford, IL (US)

(73) Assignee: Enviro-Care Company, Inc., Rockford, IL (US)

( * ) Notice: Subject to any disclaimer, the term of this patent is extended or adjusted under 35 U.S.C. 154(b) by 232 days.

(21) Appl. No.: 10/271,354

(22) Filed: Oct. 15, 2002

(65) Prior Publication Data
US 2003/0089088 A1 May 15, 2003

Related U.S. Application Data
(60) Provisional application No. 60/329,252, filed on Oct. 12, 2001.

(51) Int. Cl.$^7$ ............................................. B01D 29/09
(52) U.S. Cl. ...................... 210/158; 210/159; 210/385; 210/388; 210/391
(58) Field of Search ................................ 210/158, 159, 210/162, 388, 391, 407, 413, 385

(56) References Cited

U.S. PATENT DOCUMENTS

| 973,697 | A | | 10/1910 | Potts | |
|---|---|---|---|---|---|
| 1,823,823 | A | * | 9/1931 | Dundas et al. | 210/413 |
| 2,102,570 | A | | 12/1937 | Lind | 210/176 |
| 2,128,347 | A | | 8/1938 | Briggs | 210/176 |
| 2,634,863 | A | | 4/1953 | Hauer | 210/176 |
| 2,899,062 | A | | 8/1959 | Heacock | 210/97 |
| 2,904,181 | A | * | 9/1959 | Baker et al. | 210/159 |
| 3,190,448 | A | | 6/1965 | Johnston et al. | 210/162 |
| 3,549,028 | A | * | 12/1970 | Neumann et al. | 210/159 |
| 3,836,463 | A | | 9/1974 | Teague et al. | 210/162 |
| 3,856,216 | A | | 12/1974 | Teague et al. | 241/46 |
| 3,909,411 | A | | 9/1975 | Angele et al. | 210/159 |
| 4,184,957 | A | | 1/1980 | Botsch | 210/155 |
| 4,214,989 | A | | 7/1980 | Rudolph et al. | 210/159 |
| 4,396,511 | A | * | 8/1983 | Neumann | 210/413 |
| 4,447,323 | A | | 5/1984 | Jackson | 210/158 |
| 4,561,975 | A | | 12/1985 | Schloss, Jr. | 210/155 |
| 4,792,394 | A | | 12/1988 | Rudzinski | 210/159 |
| 4,917,796 | A | | 4/1990 | Rudzinski | 210/159 |
| 5,032,263 | A | | 7/1991 | Rudzinski | 210/159 |
| 5,098,564 | A | | 3/1992 | Miller et al. | 210/236 |
| 5,565,093 | A | | 10/1996 | Frankenberger | 210/158 |
| 5,718,771 | A | * | 2/1998 | Cassell et al. | 210/159 |
| 5,901,857 | A | | 5/1999 | Schurman | 209/674 |
| 5,975,443 | A | | 11/1999 | Hundt et al. | 241/27 |
| 6,006,922 | A | | 12/1999 | Bielagus | 209/396 |
| 6,010,013 | A | | 1/2000 | Brauch et al. | 209/379 |
| 6,016,920 | A | | 1/2000 | Brauch et al. | 209/379 |
| 6,251,268 | B1 | | 6/2001 | Holmberg | 210/155 |

FOREIGN PATENT DOCUMENTS

DE 272029 3/1914

* cited by examiner

Primary Examiner—Christopher Upton
(74) Attorney, Agent, or Firm—DuFault Law Firm

(57) ABSTRACT

An automatic debris removal system for screening an effluent stream. The automatic debris removal system comprises a support frame positioned proximate the effluent stream, a bucket positionably connected to the frame, and a camming system attached to the support frame and the bucket. The bucket includes a screening portion and is positionable within the effluent stream to screen and collect the debris. The bucket is positionable within the support frame, and upon raising the bucket past a selected position, the camming system causes the bucket to rotate and dump the debris held therein.

19 Claims, 4 Drawing Sheets

DEBRIS REMOVAL SYSTEM

CROSS-REFERENCE TO RELATED APPLICATION(S)

This application claims the benefit of U.S. Provisional Patent Application No. 60/329,252 filed on Oct. 12, 2001.

BACKGROUND OF THE INVENTION

The present invention generally relates to solid debris removal from a liquid stream. In particular, the present invention relates to an apparatus for intercepting debris and trash moved by a liquid through a conduit, pipe, channel, tank or well, and automatically elevating the removed trash and debris to a receptacle or conveying system.

Screening devices are commonly used for removing solid materials from liquid flow streams, such as in waste water treatment systems, food processing lines, and the like. Such devices typically include a screen that is disposed in the liquid flow stream for screening solids and debris from the flow stream, and a rake that is cyclically operated for removing the accumulated materials from the screen. With such screening devices, a lift often is employed for receiving and elevating the screened debris and solids to a suitable discharge height for dumping into a transfer conveyor, bin, truck or the like. Such lifts generally include a solids receiving container into which the solids are received from the screening device, and means for raising the container to the desired elevated location for dumping. Because movement of the lift container is dictated by the specific arrangement of the screening device and transfer conveyor or receiving bin, and often required multi-directional transfer, conventional lifts have been relatively complicated in construction and operation and require custom design for proper installation. Falling debris and other contaminating materials that can exist or accumulate on the equipment also can hinder proper operation, particularly when precision interaction is required between moving mechanical parts. Lifting of heavy, water-laden loads has presented further operating problems.

Prior art self-relieving bar screens with rakes have very complex mechanical drive systems such as cable and pulley systems, chain and sprocket systems, rack and pinion systems, or manual systems of similar design. Systems of the prior art are high maintenance and inefficient, allowing the accumulation of debris or the pass-through of debris and trash during the cleaning cycle. Due to their design, the prior art systems had many moving parts subject to wear and tear and requiring maintenance. Additionally, systems of the prior art typically have drive parts at or below the incoming water channel or conduit level which can become contaminated, corroded or jammed, or otherwise cause malfunction. Hence, existing lifts have been relatively expensive, and by virtue of their complexity and the environments in which they are used, subject to considerable maintenance.

The present invention is generally located in an unmanned environment where reliability is very important since trash buildup defeats the purpose of the invention.

SUMMARY OF THE INVENTION

An automatic, self cleaning traveling basket that incorporates a screen to filter trash and debris in an effluent stream flowing from a conduit, pipe or channel, typically sewage or storm water. The basket with the incorporated screen is parked at a slightly lower level than the effluent stream exiting the conduit. The effluent stream passes through the bars of the basket which retain the debris and trash. Upon filling, the basket is lifted via a ball screw drive mechanism to a predetermined dump height at which time, via a fork and roller mechanism using a cam action, the basket is rotated up to 160 degrees to dump the debris held therein. Upon completion of the rotation, the basket is returned to a home position by reversing the ball screw mechanism. The basket is lowered to receive the effluent stream and debris, and the cycle is continued.

DETAILED DESCRIPTION

Figure 1:
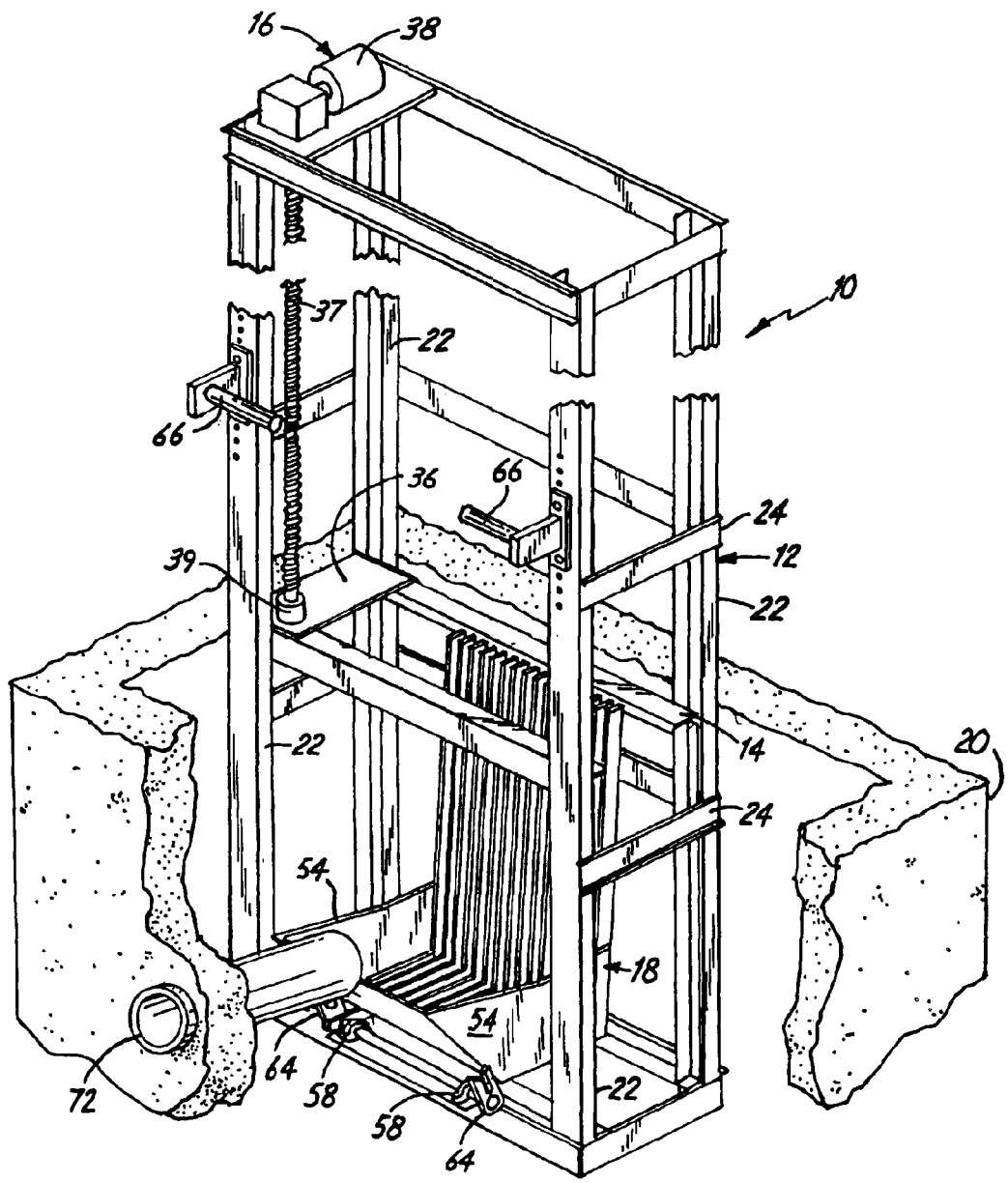
FIG. 1 is a perspective view of the present invention positioned within a tank or well.

The debris removal system of the present invention is generally indicated at 10 in FIG. 1. The debris removal system generally comprises a support frame 12, a carriage 14 movable upon the support frame 12, a ball screw drive mechanism 16 to raise and lower the carriage 14, and a basket 18 pivotally attached to the carriage 14. The support frame 12 is positionable within a tank or well 20 and provides a means for supporting the carriage 14, the basket 18 and ball screw drive 16. The support frame 12 can be designed to retrofit existing facilities, or it may be incorporated into the development of future projects. The support frame 12 includes four rails 22 positioned one at each corner. A plurality of horizontal support braces 24 space the rails 22 apart. Each rail 22 may be custom made to a specified length depending on the size of a tank or a well 20, however, it is within the scope of the present invention to provide the support frame 12 in modular sections with each section attachable to the other. Thus, the overall length of the support frame 12 may vary depending on the particular application.

The support frame 12 attaches to an inside wall of the well or tank 20 by way of anchor support arms 26. The support frame 12 may be mounted from a substantially vertical position to an approximate 45 degree angle, depending on the particular application. Terminal ends of each anchor support arm 26 anchor to the inside wall of the tank or well 24 and to the support frame 12.

Figure 2:
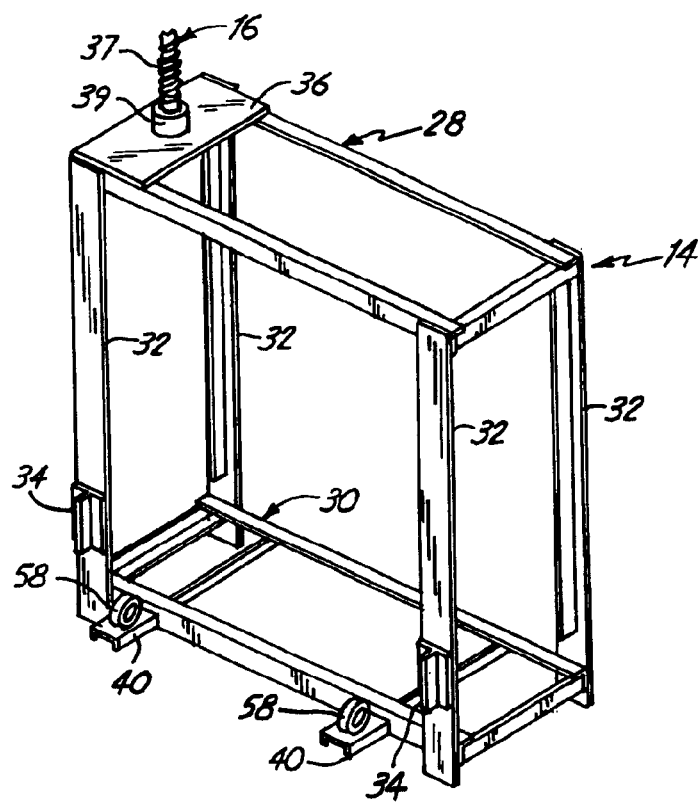
FIG. 2 is a perspective view of a carriage of the present invention.
Figure 3:
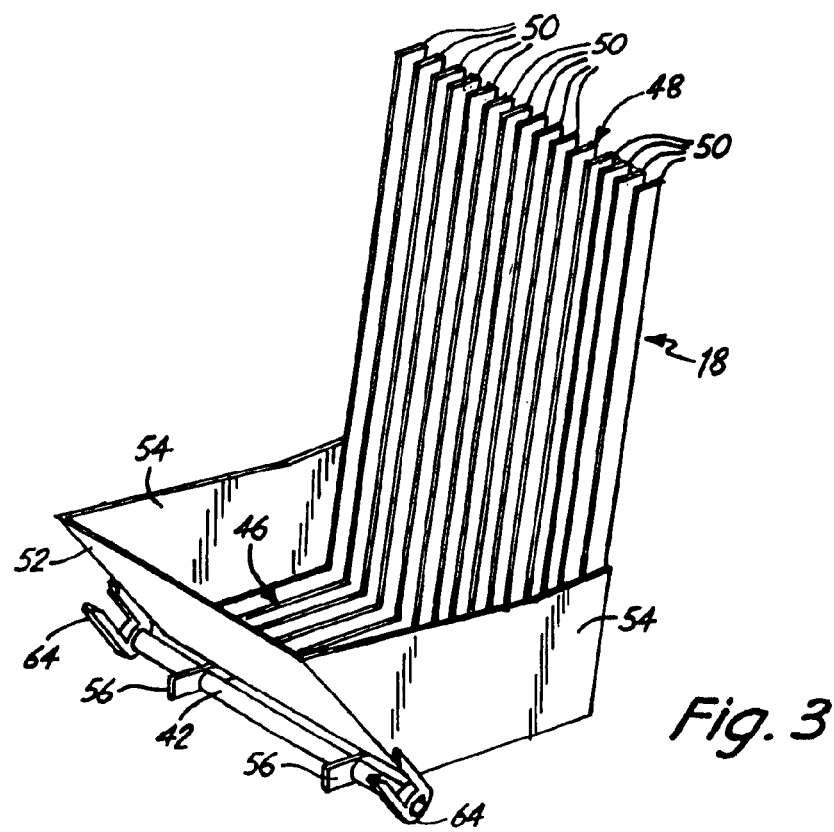
FIG. 3 is a perspective view of a bucket of the present invention.

As illustrated in FIG. 2, the carriage 14 is positioned within the support frame 12 such that the carriage 14 is allowed to be raised and lowered via the ball screw mechanism 16. As shown in FIG. 3, the carriage 14 includes a rectangular upper portion 28 and a rectangular lower portion 30 joined together by a plurality of vertical strut members 32. Each portion 28 and 30 also includes slide plates 34 attached at corners to engage the rails 22 of the support frame 12. The carriage 14 is raised or lowered within the support frame 12 by the ball screw drive mechanism 16. The ball screw drive mechanism 16 connects to a mounting plate 36 attached to the upper portion 28. The ball screw drive mechanism 16 is similar to those fully described in U.S. Pat. No. 4,792,394 entitled "Bar Screen Apparatus," U.S. Pat.

No. 4,917,796 entitled "Lift with Automated Dump" and U.S. Pat. No. 5,032,263 entitled "Bar Screen and Rake Apparatus," all issued to Rudzinski and commonly assigned to Applicant, of which all are hereby fully incorporated herein by reference. Preferably, the ball screw drive mechanism 16 of the present invention includes a ball screw shaft 37 operably connected to a hydraulic motor 38 and engaging a ball bearing nut 39. It should be noted, though, that alternative ball screw drive mechanisms and alternative means for raising or lowering the carriage 14 are well within the scope of the present invention, including providing threaded shafts having either fine or course threads, providing alternative hydraulic or electric motors, and the use of hydraulic cylinders. The ball bearing nut 39 connects to the mounting plate 36 positioned off-center to allow the basket 18 to be raised or lowered alongside the length of the screw 37. The lower portion 30 of the carriage 14 further includes dump arms 40 for supporting aligned bushings 58 for receiving a dump shaft 42 attached to the basket 18.

As illustrated in FIG. 3, the basket 18 is constructed to have at least one screen portion to prevent the passage of debris while allowing the effluent stream to pass therethrough. Preferably, the screen portion of the basket includes a bottom portion 46 and aback portion 48. To form the screen, the bottom and back portions 46 and 48 of the basket 18 include a plurality of spaced apart bars 50 positioned proximate one another in a substantially parallel relationship. The spacing between each bar 50 may be varied according to debris size, preferably from one-quarter of an inch to three inches. The basket 18 further includes a front plate 52 and opposing side plates 54. Preferably, the front plate 52 and the side plates 54 do not allow the travel of either water or debris therethrough, however it would be within the scope of the present invention to provide either the front plate 52 or side plates 54 with a bar screen construction similar to the bottom and back portions 46 and 48 of the basket 18.

Attached to and extending away from the basket 18 are support members 56 for fixedly attaching the dump shaft 42 to the basket 18. As described, the bushings 58 attached to the dump arms 40 of the carriage 14 receive the dump shaft 42, and thus the dump shaft 42 and bushings 58 pivotally connect the basket 18 to the carriage 14. The basket 18 is allowed to rotate about the carriage 14 from a home position 60, in which the basket 18 rests upon the carriage 14, to a dumped position 62 wherein the basket 18 can be rotated up to 160 degrees from the home position 60. Since the bushings 58 allow the dump shaft 42 to rotate therein, the bushings 58 can alternatively be sealed bearings which assist in the ease of rotating the bucket 18. Preferably, the dump shaft 42 is of an appropriate diameter to mateably engage each bushing or sealed bearing 58 attached to each dump arm 40. Fixedly attached to terminal ends of the dump shaft 42 are forked members 64 for engaging stop shafts 66, which through a camming action, rotate the bucket 18 between the home position 60 and the dump position 62.

Figure 4:
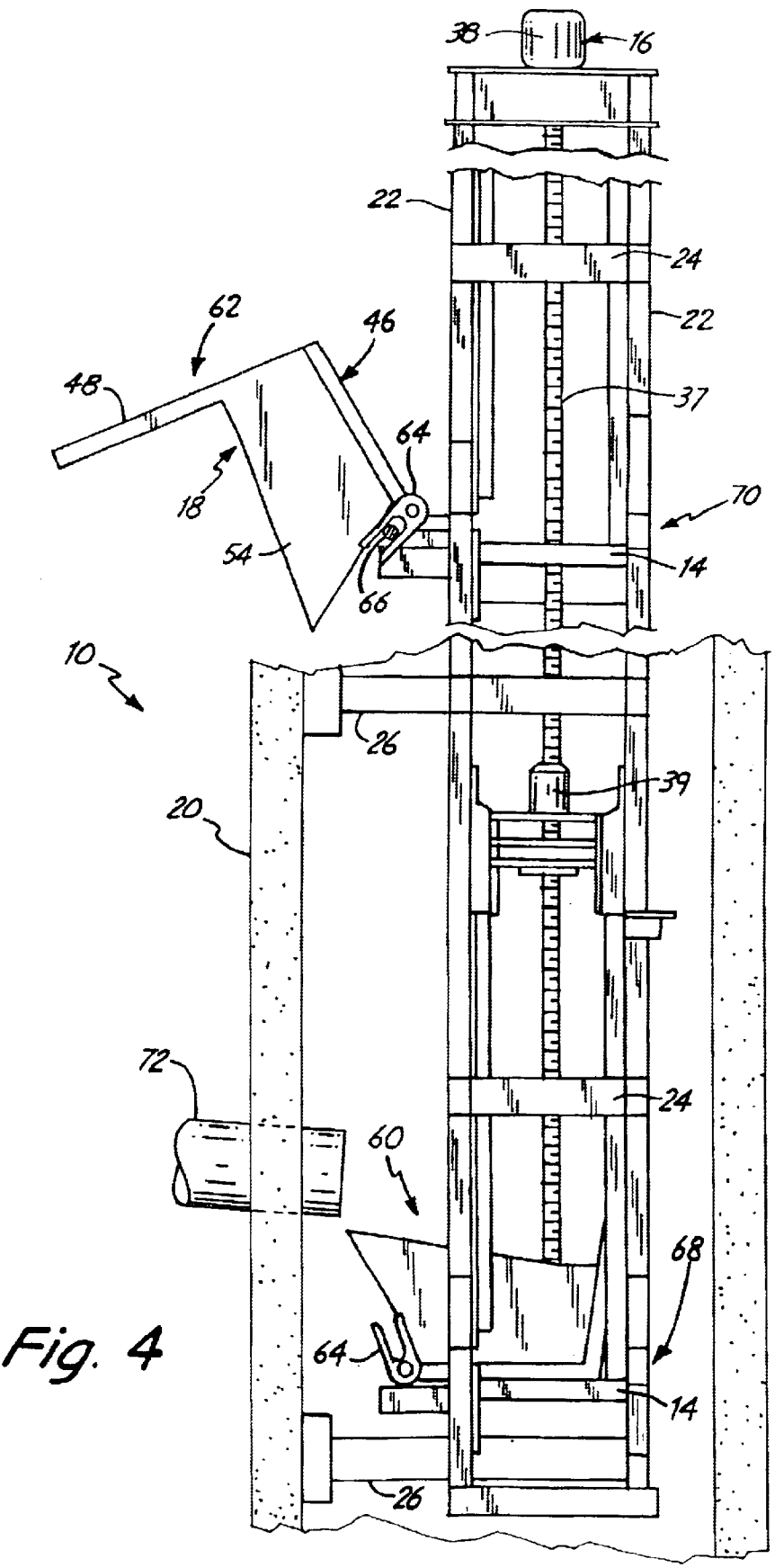
FIG. 4 is a side view of the present invention positioned within the tank or well.

In operation, the carriage 18 is movable between a lowered screening station 68 and a raised dumping station 70. As illustrated in FIG. 4, when the carriage 14 is at the screening station 68, the basket 18 is at the home position 60 resting upon the carriage 14 and is positioned below a conduit or pipe 72 having an effluent stream flowing therefrom. The effluent stream exits the pipe 72, and by gravitational flow passes through the bottom and back screen portions 46 and 48 of the basket 18. Debris of a minimum selected size is prohibited from traveling through the screen portions 46 and 48 of the basket 18, and is thus collected within the basket 18. The minimum selected size of the debris is dependent upon the spacing between each bar member 50 of the screening portions 46 and 48 of the basket 18. Upon the basket 18 being filled to capacity, or at specified intervals, the ball screw mechanism 16 is activated and the carriage 14, along with the screen basket 18, is raised from the lowered screening station 60 toward the dump station 70.

After raising the carriage 14 to a selected height, the forks 64 engage the stop shafts 66 attached to the support frame 12. The selected height is defined by the position of the stop shafts 66 on the support frame 12. The stop shafts 66 can be raised or lowered along the support frame 12 to adjust the height at which the basket 18 will dump the debris. The selected height may be adjusted to accommodate for dumping into different sized refuse bins or trucks (not shown) used to collect the debris upon dumping from the basket 18. Preferably, the stop shafts 66 secure to the frame 12 by way of threaded bolts, but any other adjustable securing means are well within the scope of the present invention, including U-bolts, tension straps and the like.

Figure 5A:
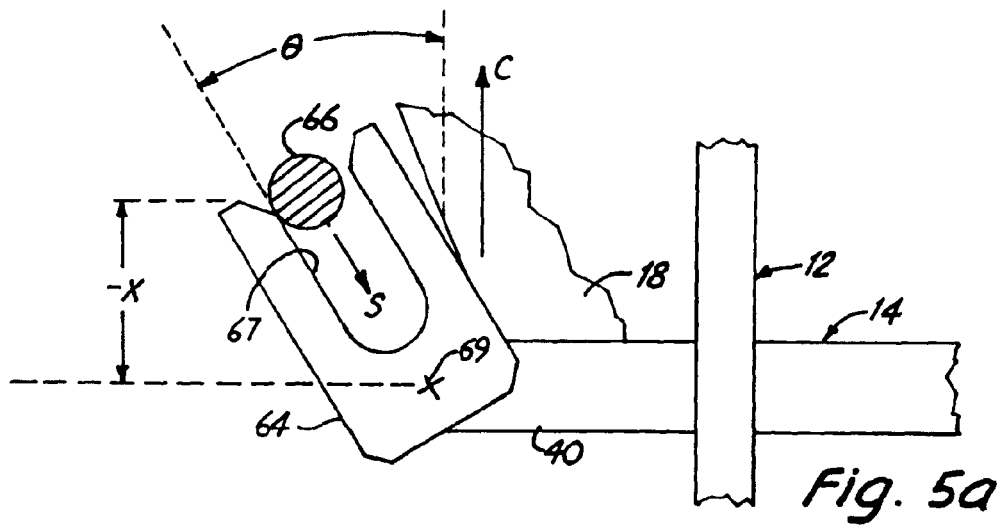
FIG. 5 is a side view of a fork engaging a stop shaft of the present invention at several positions.
Figure 5B:
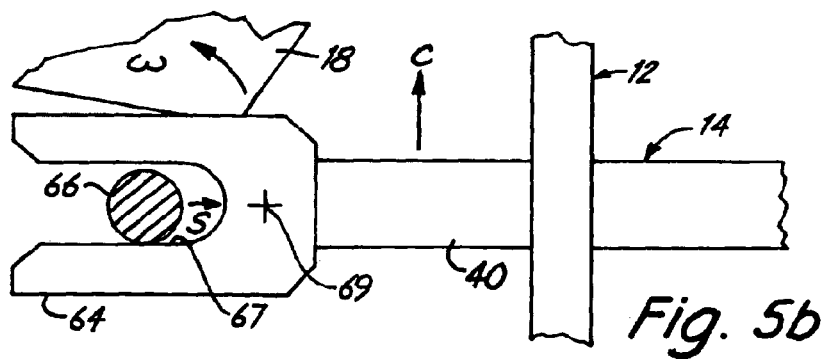

FIG. 5 illustrates several stages of a fork 64 engaging a stop shaft 66. As illustrated in FIG. 5a, the fork 64 is positioned at an initial angle θ relative to sliding direction s of the shaft and the traveling direction c of the carriage. Preferably, θ is greater than 0° and less than 90° measured. More preferably, θ is between 15° and 85°. Most preferably, θ is between 30° and 70°. By varying θ, the initial angular velocity ω at which the basket dumps is varied. Upon the forked member 64 contacting the stop shaft 66, the stop shaft 66 slides upon a surface 67 of the fork 64. As illustrated in FIG. 5b, further raising of the carriage 14 causes the stop shaft 66 to further travel on the surface 67 of the fork 64, resulting in the basket 18 rotating about the lower carriage 30 by a reverse-camming action. By reverse-camming action it is meant that translational movement of the carriage 14 causes sliding and rotational movement of the fork 64 about the stop shaft 66, which in turn creates a moment about the basket 18.

Figure 5C:
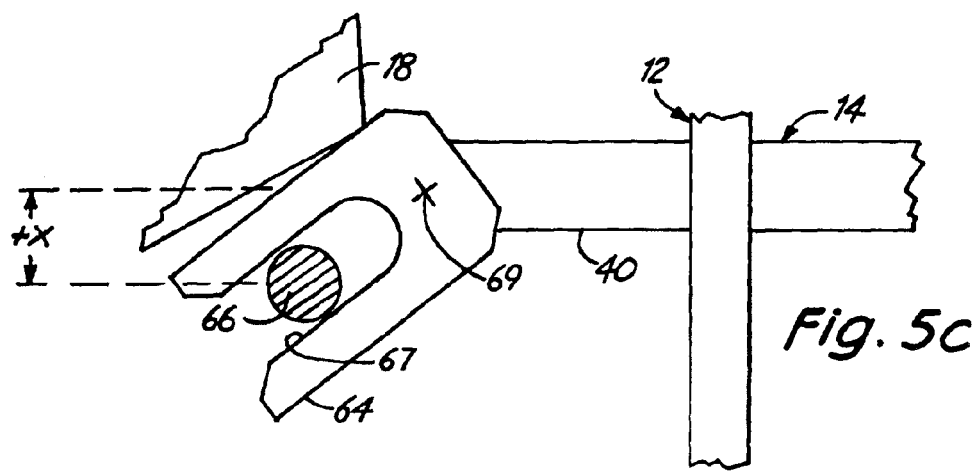

The angular velocity ω of the fork 64 (and thus the basket 18) while it is being dumped can be represented by a function of the position of the stop shaft 66 in relation to the pivot point 69 of the basket 18, represented in FIG. 5 by x. In FIG. 5a, the position of the stop shaft 66 in relation to the pivot point 69 at initial contact is represented by −x. In FIG. 5b the distance x decreases to zero, as the stop shaft 66 and pivot point 69 are level with one another. In FIG. 5c the distance is indicated by +x. As the absolute value of x approaches zero, the angular velocity ω increases. Therefore, the angular velocity ω is least in FIGS. 5a and 5c, and greatest in FIG. 5b where x is zero. This results in a fluid, dumping motion with the angular velocity ω increasing and decreasing similar to a bell curve. The angular velocity ω changes gradually, not suddenly, while dumping the bucket. With this gradual change in angular velocity ω, wear and tear on debris removal system 10 is reduced. It should also be noted that by changing the length of the fork member 64, or changing the diameter of the stop shaft 66, the overall angular velocity ω of the basket 18 while dumping can be regulated, while still keeping the same characteristics of increasing or decreasing the angular velocity ω as the absolute value of x approaches zero.

Upon reaching the dumping station 70, the carriage 14 is at a maximum height and the basket 18 will have preferably rotated approximately 160 degrees to dump the contents held therein. To lower the carriage 14 and basket assembly 18 to the lowered screening station 68, the direction of the ball screw mechanism 16 is reversed, and the carriage 14 is lowered. The basket 18 rotates from the dumped position 62 back toward the home position 60 until the forks 64 disengage from the stop shafts 66, at which point the basket 18 again rests upon the lower portion 30 of the carriage 14. The carriage 14 and the basket 18 are then lowered to the screening station 68 located below the conduit or pipe 72, and the cycle of separating debris from the effluent stream begins again.

Although the present invention has been described with reference to preferred embodiments, workers skilled in the art will recognize that changes may be made in form and detail without departing from the spirit and scope of the invention.

What is claimed is:

1. An automatic debris removal system for screening an effluent stream, the automatic debris removal system comprising:

a support frame positionable proximate the effluent stream;

a screening basket positionably connected to the frame, the screening basket including a screening portion for directly collecting and removing debris from the effluent stream, the screening basket positionable within the effluent stream to screen and collect the debris; and a camming system attached to the support frame and the screening basket, wherein raising the screening basket past a selected position causes the camming system to rotate the screening basket and dump the debris held therein.

2. The automatic debris removal system of claim 1 and further comprising a carriage, the carriage positionably attached within the support frame, wherein the screening basket rotatably attaches to the carriage, wherein raising the carriage past a selected height causes the camming system to rotate the screening basket and dump the debris held therein.

3. The automatic debris removal system of claim 1 wherein the camming system comprises:

a shaft member attachable to the support frame; and a forked member attached to the screening basket for engaging the shaft member at the selected height, the forked member including a sliding surface, wherein raising the screening basket past the selected height causes the shaft to travel upon the sliding surface to rotate the screening basket.

4. The automatic debris removal system of claim 1 wherein the screening basket is rotatable up to 160° from a home position to a dumped position.

5. The automatic debris removal system of claim 1 and further comprising a drive to raise and lower the screening basket.

6. The automatic screening apparatus of claim 1 wherein the screening basket comprises:

a bottom portion;

a back portion extending from the bottom portion;

a forward portion extending from the bottom portion; and opposing side members, each side member extending from the bottom portion connecting to the forward portion and the rearward portion, wherein at least one portion includes a plurality of spaced apart members to prevent the passage of debris and allow the effluent stream to pass therethrough.

7. An automatic screening apparatus for screening an effluent stream containing debris, the automatic screening apparatus comprising:

a support frame;

a carriage positionable within the support frame;

a mechanism for positioning the carriage within the support frame;

a bucket rotatably attached to the carriage, the carriage positionable to place the bucket within the effluent stream, the bucket including a screening portion that directly collects debris from the effluent stream while permitting the effluent stream to pass therethrough, wherein raising the carriage past a selected height causes the bucket to rotate and dump the debris.

8. The automatic screening apparatus of claim 7 wherein the mechanism for positioning the carriage is a ball screw drive attached to the carriage and the support frame.

9. The automatic screening apparatus of claim 7 and further comprising:

a forked member attached to the bucket, the forked member including a sliding surface; and a shaft member attachable upon the support frame, wherein raising the carriage past the selected height causes the shaft member to engage the sliding surface and rotate the bucket.

10. The automatic screening apparatus of claim 9 wherein repositioning the shaft member adjusts the selected height for dumping the bucket.

11. The automatic screening apparatus of claim 7 wherein the bucket comprises:

a bottom portion;

a back portion extending from the bottom portion;

a forward portion extending from the bottom portion; and opposing side members, each side member extending from the bottom portion connecting to the forward portion and the rearward portion; wherein at least one portion includes a plurality of spaced apart members to prevent the passage of debris and allow the effluent stream to pass therethrough.

12. The automatic screening apparatus of claim 11 and further comprising:

a forked member attached to the forward portion of the bucket, the forked member including a sliding surface; and a shaft member attachable upon the support frame, wherein raising the carrige past the selected height causes the shaft member to engage and travel upon the sliding surface and rotate the bucket.

13. An automatic debris removal system for screening an effluent stream containing debris, the automatic debris removal system comprising:

a support frame positionable proximate the effluent stream a carrige positionable within the support frame; and a bucket rotatably attached to the carriage, the bucket including a screening portion to directly collect debris from the effluent stream while allowing the effluent stream to pass therethrough, wherein the bucket is positionable within the effluent stream and wherein raising the carrige past a selected position causes the bucket to rotate and dump the debris held therein.

14. The automatic debris removal system of claim 13 and further comprising a camming system attachable to the support frame and the bucket, the camming system causing the bucket to rotate upon raising the carriage past the selected height.

15. The automatic debris removal system of claim 14 wherein the camming system comprises:

a forked member attached to the bucket; and a camming member attachable to the support frame, wherein raising the carriage past the selected height causes the camming member to engage the forked member and rotate the bucket.

16. The automatic debris removal system of claim 15 wherein the forked member includes a sliding surface, wherein raising the carriage past the selected height causes the camming member to engage the sliding surface and rotate the bucket.

17. The automatic screening apparatus of claim 13 wherein the bucket comprises:

a bottom portion;

a back portion extending from the bottom portion;

a forward portion extending from the bottom portion; and opposing side members, each side member extending from the bottom portion connecting to the forked portion and the rearward portion, wherein at least one portion includes a plurality of spaced apart members to prevent the passage of debris and allow the effluent stream to pass therethrough.

18. The automatic screening apparatus of claim 13 and further comprising:

a first shaft rigidly attached to the bucket and pivotably connected to the carriage;

a forked member attached to the first shaft the forked member including a sliding surface; and a second shaft attachable to the support frame, wherein raising the carriage past the selected position the second shaft engages and travels along the sliding surface to rotate the bucket.

19. The automatic screening apparatus of claim 13 wherein the screening portion includes a plurality of bars positioned substantially parallel and spaced apart a selected distance from one another, the plurality of spaced apart bars preventing the passage of debris and allowing the effluent stream to pass therethrough.

* * * * *